(12) United States Patent
Xi et al.

(10) Patent No.: US 10,514,813 B2
(45) Date of Patent: Dec. 24, 2019

(54) IN-CELL INDUCTIVE ELECTRONIC PAPER TOUCH DISPLAY PANELS, TOUCH DETECTING METHODS THEREOF AND ELECTRONIC DEVICES

(71) Applicant: Shanghai AVIC OPTO Electronics Co., Ltd., Shanghai (CN)

(72) Inventors: Kerui Xi, Shanghai (CN); Tingting Cui, Shanghai (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 131 days.

(21) Appl. No.: 15/813,809

(22) Filed: Nov. 15, 2017

(65) Prior Publication Data
US 2018/0074623 A1     Mar. 15, 2018

(30) Foreign Application Priority Data

May 27, 2017  (CN) .......................... 2017 1 0388215

(51) Int. Cl.
*G06F 3/046*      (2006.01)
*G06F 3/0354*    (2013.01)
(Continued)

(52) U.S. Cl.
CPC .......... *G06F 3/046* (2013.01); *G06F 3/03545* (2013.01); *G06F 3/0412* (2013.01); *G06F 2203/04103* (2013.01); *G09G 3/344* (2013.01)

(58) Field of Classification Search
CPC ........ G06F 3/045; G06F 3/046; G06F 3/0412; G06F 3/047; G06F 3/03545;
(Continued)

(56) References Cited

U.S. PATENT DOCUMENTS 9,285,916 B2 *   3/2016  Xi ........................... G06F 3/047
2004/0189587 A1 *  9/2004  Jung ................... G02F 1/13338
345/102

(Continued)

FOREIGN PATENT DOCUMENTS

CN         1534333 A      10/2004
CN       103927069 A       7/2014
(Continued)

*Primary Examiner* — Darlene M Ritchie
(74) *Attorney, Agent, or Firm* — Alston & Bird LLP

(57) ABSTRACT

An electronic paper display panel, a touch detecting method thereof and an electronic device are provided. The electronic paper display panel includes: a first substrate and a pixel electrode array which is arranged on the first substrate; an inductance coil array disposed between the first substrate and the pixel electrode array and including a plurality of inductance coils arranged in array, each inductance coil has an input terminal and an output terminal; a plurality of driving lines arranged with the plurality of inductance coils respectively, each driving line is electrically connected to the input terminal of the corresponding inductance coil; and a plurality of touch lines arranged with the plurality of inductance coils respectively, each touch line is electrically connected to the output terminal of the corresponding inductance coil.

20 Claims, 11 Drawing Sheets

(51) Int. Cl.
*G06F 3/041* (2006.01)
*G09G 3/34* (2006.01)

(58) Field of Classification Search
CPC .......... G06F 2203/04103; B41J 3/4076; G02F 1/167; G02F 1/1681; G09G 3/344
See application file for complete search history.

(56) References Cited

U.S. PATENT DOCUMENTS

| | | | |
|---|---|---|---|
| 2010/0265190 A1* | 10/2010 | Rofougaran | G06F 3/046 345/173 |
| 2011/0248934 A1* | 10/2011 | Yeh | G06F 3/044 345/173 |
| 2014/0049882 A1* | 2/2014 | Lin | G06F 1/1601 361/679.01 |
| 2014/0190807 A1* | 7/2014 | Xie | G06F 3/044 200/5 A |
| 2014/0333574 A1* | 11/2014 | Xi | G06F 3/046 345/174 |
| 2016/0011705 A1* | 1/2016 | Huang | G06F 3/044 345/174 |
| 2016/0124514 A1* | 5/2016 | Cha | G06F 3/017 715/767 |
| 2016/0306534 A1* | 10/2016 | Woo | G06F 3/04847 |
| 2017/0269763 A1* | 9/2017 | Yang | G06F 3/0412 |
| 2017/0322662 A1* | 11/2017 | Hsieh | G02B 6/0088 |
| 2017/0371473 A1* | 12/2017 | David | G06F 3/0416 |
| 2018/0067590 A1* | 3/2018 | Wang | G02F 1/13338 |
| 2018/0081463 A1* | 3/2018 | Zhang | G02F 1/133308 |
| 2018/0373377 A1* | 12/2018 | Ye | G06F 3/0412 |

FOREIGN PATENT DOCUMENTS

| | | |
|---|---|---|
| CN | 104063091 A | 9/2014 |
| CN | 105786290 A | 7/2016 |
| CN | 105810717 A | 7/2016 |

* cited by examiner

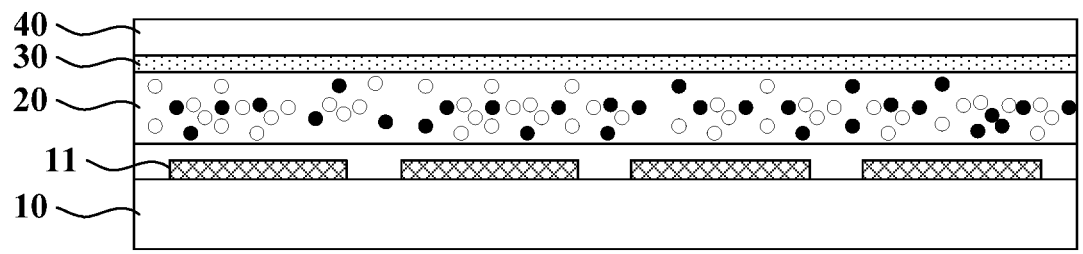
Fig. 1   --Prior Art--
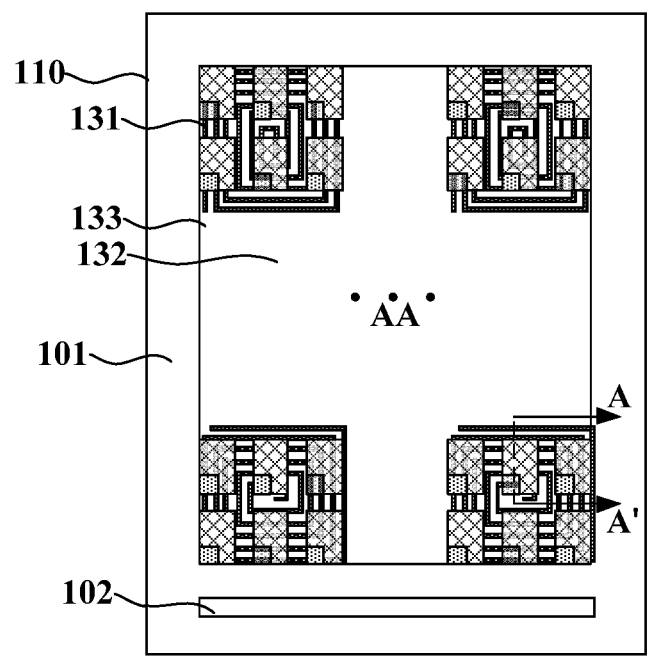
Fig. 2

IN-CELL INDUCTIVE ELECTRONIC PAPER TOUCH DISPLAY PANELS, TOUCH DETECTING METHODS THEREOF AND ELECTRONIC DEVICES

CROSS-REFERENCES TO RELATED APPLICATIONS

This application claims priority to Chinese patent application No. CN201710388215.9, filed on May 27, 2017, the disclosure of which is incorporated herein by reference in its entirety.

TECHNICAL FIELD

The present disclosure relates to the field of display, in particular to an electronic paper display panel, a touch detecting method thereof and an electronic device.

BACKGROUND

Electronic paper, also known as digital paper, is an ultra-thin, ultra-light display screen, and has become a closely watched display technology for future generations. In an existing electronic paper display, screens adopting electrophoretic display technologies are used mostly as display panels, the display effect is close to reading a natural paper, making a user free from reading fatigue. In addition, it has the advantages such as being ultra-thin light, flexible, ultra-low power consumption, displaying delicate and wide viewing angles.

FIG. 1 shows a schematic cross sectional view of an electronic paper display panel provided by an existing art. The electronic paper display panel includes an array substrate 10, an electrophoretic function layer 20, a common electrode layer 30, and a protection film 40. After applying signals to the common electrode layer 30 and a pixel electrode 11 of the array substrate 10 so as to generate an electric filed between two sides of the electrophoretic function layer 20, charged particles in the electrophoretic function layer 20 are moved in transparent or colored liquid, flipped or flowing charged particles cause the pixels to brighten or darken, thereby realizing display.

SUMMARY

The present disclosure provides an electronic paper display panel, a touch detecting method thereof and an electronic device so as to the in-cell touch of the electronic paper display screen.

According to a first aspect, an embodiment of the present disclosure provides an electronic paper display panel. The electronic paper display panel includes:

a first substrate and a pixel electrode array which is arranged on the first substrate;

an inductance coil array, disposed between the first substrate and the pixel electrode array, wherein the inductance coil array includes a plurality of inductance coils arranged in array, each inductance coil has an input terminal and an output terminal;

a plurality of driving lines, correspondingly arranged with the plurality of inductance coils respectively, wherein each driving line is electrically connected to the input terminal of the corresponding inductance coil; and A plurality of touch lines, correspondingly arranged with the plurality of inductance coils respectively, wherein each touch line is electrically connected to the output terminal of the corresponding inductance coil.

According to a second aspect, an embodiment of the present disclosure provides a touch detecting method of an electronic paper display panel. The electronic paper display panel includes: a first substrate and a pixel electrode array which is arranged on the first substrate; an inductance coil array, disposed between the first substrate and the pixel electrode array, and comprising a plurality of inductance coils arranged in array, each inductance coil has an input terminal and an output terminal; a plurality of driving lines, correspondingly arranged with the plurality of inductance coils respectively, wherein each driving line is electrically connected to the input terminal of the corresponding inductance coil; and a plurality of touch lines, correspondingly arranged with the plurality of inductance coils respectively, wherein each touch line is electrically connected to the output terminal of the corresponding inductance coil;

wherein the touch detecting method includes:

applying a touch driving signal to the plurality of inductance coils via the plurality of driving lines;

obtaining a touch sensing signal generated by the corresponding inductance coils via the touch lines when a touch happens; and determining a touch position according to changes of touch driving signals and touch sensing signals of various of the plurality of inductance coils before and after the touch.

According to a third aspect, an embodiment of the present disclosure provides an electronic device including the above electronic paper display panel.

The electronic paper display panel according to embodiments of the present disclosure includes an inductance coil array. Each inductance coil of the inductance coil array is capable of sensing an external magnetic field. When the external magnetic field contacts the surface of the electronic paper display panel, currents in the inductance coils change according to the sensed magnetic field strengths, so the electronic paper display panel can determine the touch position according to the current change of each inductance coil, thereby achieving integration of electronic paper display technology and in-cell inductance touch technology, as well as passive stylus-based touch, high precision touch, real reduction of handwriting and the like.

BRIEF DESCRIPTION OF DRAWINGS

In order to more clearly illustrate the technical solutions in embodiments of the present disclosure or related art, the drawings, which are used in the description of embodiments or the related art, are briefly described below. Apparently the drawings are some embodiments of the present disclosure, and other drawings may be obtained by those skilled in the art without creative work.

FIG. 1 is a schematic cross sectional view of an electronic paper display panel according to a related art;

FIG. 2 is a schematic top view of an electronic paper display panel according to an embodiment of the present disclosure;

DETAILED DESCRIPTION

Figure 3A:
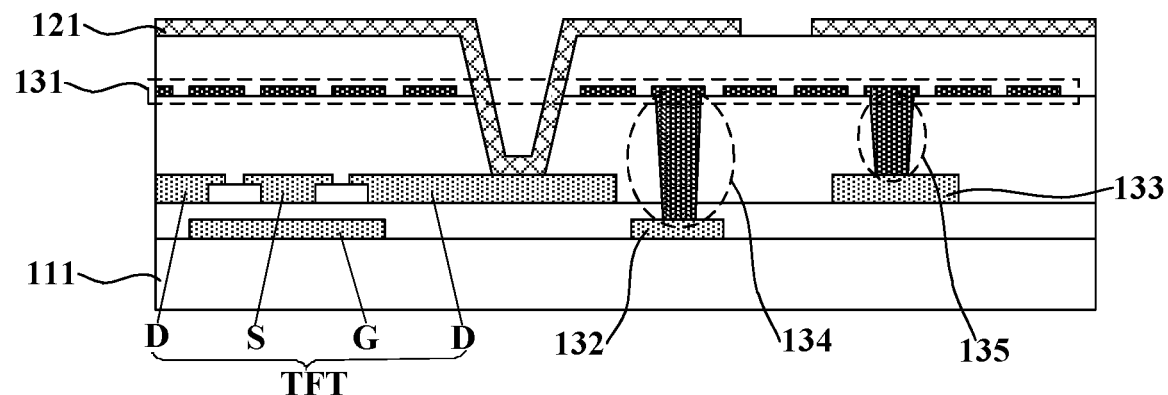
FIG. 3A to FIG. 3F are cross sectional views taken along A-A' in FIG. 2.

In order to make the purpose, technical solution and advantages of the present disclosure more clear, the technical solution of the present disclosure will be described clearly and completely by ways of embodiments with reference to the accompanying drawings Based on embodiments in the present disclosure, all other embodiments obtained by those of ordinary skill in the art without creative work are within the scope of the present disclosure.

An embodiment of the present disclosure provides an electronic paper display panel. The electronic paper display panel includes: a first substrate and a pixel electrode array which is arranged on the first substrate; an inductance coil array disposed between the first substrate and the pixel electrode array and including a plurality of inductance coils arranged in array, each inductance coil has an input terminal and an output terminal; a plurality of driving lines, each of which corresponds a respective one of the plurality of inductance coils respectively, each driving line is electrically connected to the input terminal of the corresponding inductance coil; and a plurality of touch lines, each of which corresponds a respective one of the plurality of inductance coils respectively, each touch line is electrically connected to the output terminal of the corresponding inductance coil.

The electronic paper display panel in an embodiment of the present disclosure may employ electrophoretic display technology to display, which is not described here. However, the display technology of the electronic paper display panel of embodiments of the present disclosure includes but not limited to the electrophoretic display technology, for example, cholesteric liquid crystal display technology and electro-wetting display technology and the like may be employed.

The electronic paper display panel in an embodiment of the present disclosure includes the inductance coil array which is arranged between the first substrate and the pixel electrode array. The input terminal of the inductance coil is electrically connected to a driving IC via a corresponding driving line. The output terminal of the inductance coil is electrically connected to the driving IC via a corresponding touch line. The driving IC applies a touch driving signal (i.e. driving current signal) to a corresponding inductance coil via the driving line. During touch detecting, the driving IC collects a touch sensing signal (i.e. induced current signal) generated by a corresponding inductance coil via the touch line. The electronic paper display panel in an embodiment of the present disclosure is also used with a stylus. The stylus can transmit high frequency alternating magnetic flux to generate a magnetic field. The magnetic field can penetrate an electrophoretic function layer, a protection film, a common electrode and the like of the electronic paper display panel, and will not be shielded by the common electrode layer. The current of the inductance coil can change following a varying rate of the sensed magnetic field.

It should be noted that, touch driving signals received by various inductance coils are the same, so the plurality of driving lines can be connected together and then electrically connected to the touch driving signal terminal of the driving IC. For example, when an extending direction of the driving line is parallel to the column direction of the inductance coils, each inductance coil in one column of inductance coils is electrically connected to one driving line via a though hole. Touch sensing signals generated by various inductance coils are not the same, so the plurality of touch lines need to be electrically connected to various touch sensing signal terminals of the driving IC, respectively.

During touch detecting, the driving IC applies driving current signals of the same frequency and magnitude to various inductance coils of the inductance coil array via the plurality of driving lines. During inputting by touching with the stylus, various inductance coils can sense the magnetic field of the stylus and currents of various inductance coils can change according to the varying rate of the sensed magnetic field. The driving IC collects sensing current signals of various inductance coils via the plurality of touch lines. The driving IC determines a touch position according to current changes of various inductance coils.

In view of the above, the electronic paper display panel provided by embodiments of the present disclosure includes the inductance coil array, and various inductance coils in the inductance coil array can sense change in an external magnetic field. When the external magnetic field contacts a surface of the electronic paper display panel, the current of the inductance coil changes proportional to the varying rate of the sensed magnetic field, so the electronic paper display panel can determine the touch position according to the current changes of various inductance coils, thereby achieving integration of electronic paper display technology and in-cell inductance touch technology, as well as passive stylus-based touch, high precision touch, real reduction of handwriting and the like.

The foregoing is a core idea of embodiments of the present disclosure, and the electronic paper display panel provided by the embodiment of the present disclosure is specifically described by way of following specific embodiments. It will be understood by those skilled in the art that the electronic paper display panel provided by embodiments of the present disclosure includes, but is not limited to, the following embodiments.

As shown in FIG. 2, which is a schematic top view of an electronic paper display panel according to an embodiment of the present disclosure, the electronic paper display panel includes: a first substrate 110 and a pixel electrode array which is arranged on the first substrate 110; an inductance coil array disposed between the first substrate 110 and the pixel electrode array and including a plurality of inductance coils 131 arranged in array, each inductance coil 131 has an input terminal and an output terminal; a plurality of driving lines 132 correspondingly arranged with the plurality of inductance coils 131 respectively, each driving line 132 is electrically connected to the input terminal of the corresponding inductance coil 131; and a plurality of touch lines 133 correspondingly arranged with the plurality of inductance coils 131 respectively, each touch line 133 is electrically connected to the output terminal of the corresponding inductance coil 131.

The first substrate 110 is divided into a display region AA and a non-display region 101 which surrounds the display region AA. The non-display region 101 of the first substrate 110 is provided with a driving IC 102. The driving IC 102 is for touch detection and is further for driving the pixel electrode array to receive a pixel voltage. The electronic paper display panel further includes: a display function layer (not shown in FIG. 2 and multiple following figures). The display function layer is bonded to the first substrate 110 by means of adhesives. The display function layer includes an electrophoretic function layer, a common electrode layer and a protection film. A structure of the display function layer is the same as the display technique, and a structure of the related art can be referred to.

Optionally, FIG. 3A is a cross sectional view taken along A-A' in FIG. 2. As shown in FIG. 2 and FIG. 3A, in the electronic paper display panel, optionally, the first substrate 110 includes a substrate 111 and a thin film transistor array which is disposed on the substrate 111. The thin film transistor array includes a plurality of thin film transistors TFT, each of which includes a drain electrode D and a gate electrode G. The pixel electrode array includes a plurality of pixel electrodes 121. The plurality of pixel electrodes 121 are correspondingly arranged with the plurality of thin film transistors TFT, respectively. The pixel electrode 121 is electrically connected to the drain electrode D of the corresponding thin film transistor TFT. Optionally, in the present embodiment, the plurality of driving lines 132 may be arranged at the same layer with the gate electrodes G of the plurality of thin film transistors TFT and are insulated from the gate electrodes G of the plurality of thin film transistors TFT. Optionally, the plurality of touch lines 133 are arranged at the same layer with the drain electrodes D of the plurality of thin film transistors TFT and are insulated from the drain electrodes D of the plurality of thin film transistors TFT. Optionally, the gate electrodes G and the driving lines 132 are made of the same material, and the gate electrodes G of the thin film transistor array and the plurality of driving lines 132 are simultaneously formed by a photoetching process after gate electrode film deposition. Optionally, the drain electrodes D and the plurality of touch lines 133 are made of the same material, and the drain electrodes D of the thin film transistor array and the plurality of touch lines 133 are simultaneously formed by a photoetching process after drain electrode film deposition.

In the present embodiment, the inductance coil array includes the plurality of inductance coils 131 arranged in array. Optionally, the input terminals of the inductance coils 131 are electrically connected to the corresponding driving lines 132 via first through holes 134, respectively. The output terminals of the inductance coils 131 are electrically connected to the corresponding touch lines 133 via second through holes 135, respectively. Optionally, the plurality of inductance coils 131 are formed by a screen printing process or an ink jet printing process. The inductance coils 131 are electrically connected to the corresponding driving lines 132 and touch lines 133, respectively.

It should be noted that, in the present embodiment, optionally, the thin film transistor is of a double TFT structure, that is, a thin film transistor corresponding to the pixel electrode 121 has a configuration in which two TFTs are in serial connection. The specific double TFT structure has a common gate electrode, two drain electrodes and a common source electrode. With the double TFT structure, the thin film transistor can reduce a leakage current effectively and improve the display effect of the electronic paper display panel. In other optional embodiments, the thin film transistor is of a one TFT structure.

Figure 3B:
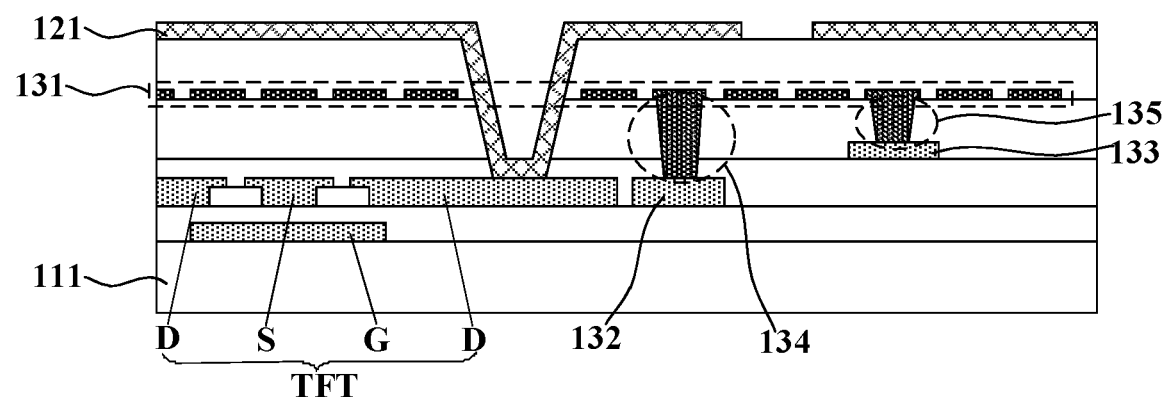

Optionally, FIG. 3B is another cross sectional view taken along A-A' in FIG. 2. FIG. 3B is different from FIG. 3A in that in the electronic paper display panel shown in FIG. 2 and FIG. 3B, optionally, the plurality of driving lines 132 are arranged at the same layer with the drain electrodes D of the thin film transistors TFT and are insulated from the drain electrodes D of the thin film transistors TFT. Optionally, the plurality of touch lines 133 are arranged between the thin film transistor array and the inductance coil array. Optionally, the drain electrodes D and the driving lines 132 are made of the same material, and the drain electrodes D of the thin film transistor array and the plurality of driving lines 132 are simultaneously formed by a photoetching process after drain electrode film deposition. Optionally, after an insulation layer is formed on the thin film transistor array, the plurality of touch lines 133 are formed by depositing a metal film and a photoetching process.

Figure 3C:
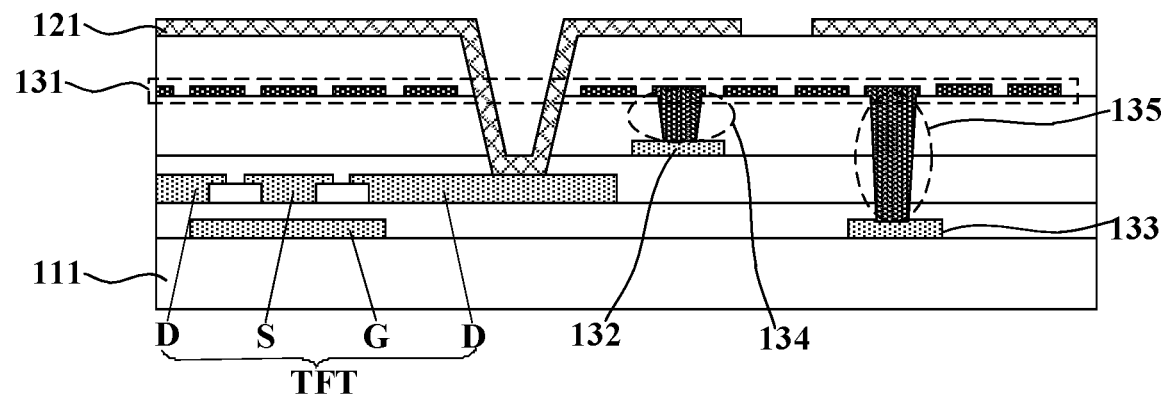

Optionally, FIG. 3C is another cross sectional view taken along A-A' in FIG. 2. FIG. 3C is different from FIG. 3A and FIG. 3B in that in the electronic paper display panel shown in FIG. 2 and FIG. 3C, optionally, the plurality of driving lines 132 are arranged between the thin film transistor array and the inductance coil array. Optionally, the plurality of touch lines 133 are arranged at the same layer with the gate electrodes G of the thin film transistors TFT and are insulated from the gate electrodes G of the thin film transistors TFT. Optionally, after an insulating layer is formed on the thin film transistor array, a metal film is deposited and a photoetching process is employed to form the plurality of driving lines 132. Optionally, the gate electrodes G and the touch lines 133 are made of the same material, and optionally, the gate electrodes G of the thin film transistor array and the plurality of touch lines 133 are simultaneously formed by a photoetching process after gate electrode film deposition.

Figure 3D:
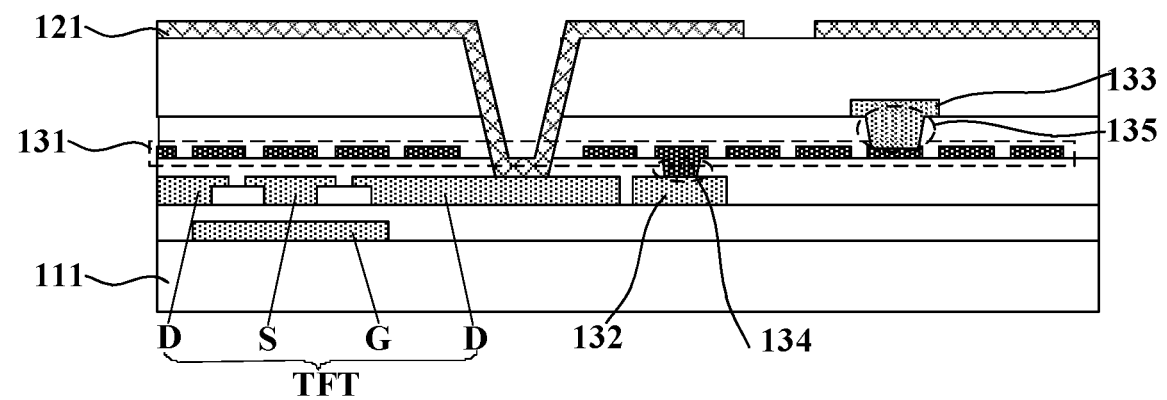

Optionally, FIG. 3D is another cross sectional view taken along A-A' in FIG. 2. FIG. 3D is different from FIG. 3A to FIG. 3C in that in the electronic paper display panel shown in FIG. 2 and FIG. 3D, optionally, the plurality of driving lines 132 are arranged at the same layer with the drain electrodes D of the thin film transistor array and insulated from the drain electrodes D of the thin film transistor array. The plurality of touch lines 133 are arranged between the inductance coil array and the pixel electrode array. Optionally, the drain electrodes D and the driving lines 132 are made of the same material, and optionally, the drain electrodes D of the thin film transistor array and the plurality of driving lines 132 are simultaneously formed by a photoetching process after drain electrode film deposition. Optionally, after the plurality of second through holes 135 at an insulation layer on the inductance coil array are formed, a metal thin film is deposited and a photoetching process is employed to form the plurality of touch lines 133 electrically connected to the inductance coil array.

Figure 3E:
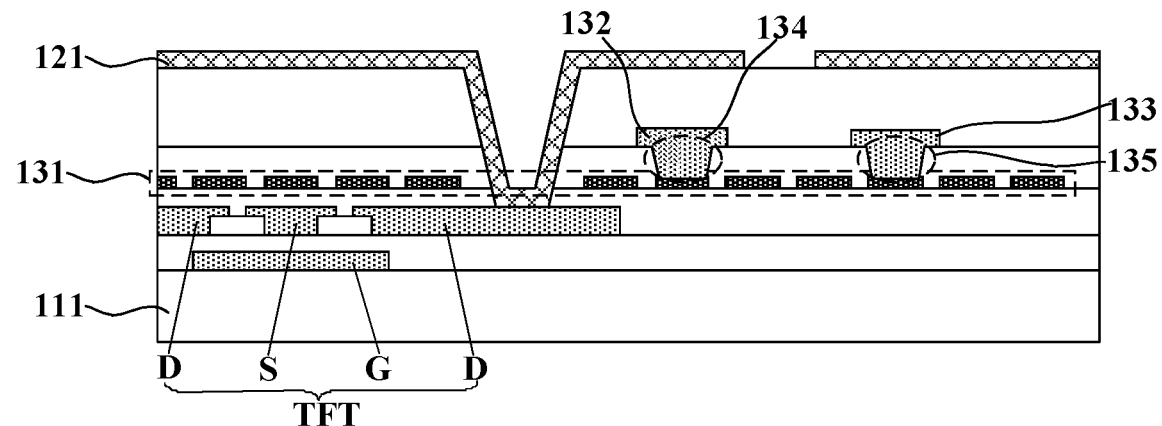

Optionally, FIG. 3E is another cross sectional view taken along A-A' in FIG. 2. FIG. 3E is different from FIG. 3A to FIG. 3D in that in the electronic paper display panel shown in FIG. 2 and FIG. 3E, optionally, the plurality of driving lines 132 are arranged between the inductance coil array and the pixel electrode array, and the plurality of touch lines 133 are arranged between the inductance coil array and the pixel electrode array. Optionally, the plurality of driving lines 132 are arranged at the same layer with the plurality of touch lines 133 and are insulated from the plurality of touch lines 133. The plurality of touch lines 133 and the plurality of driving lines 132 are made of the same material, and optionally, after the plurality of first through holes 134 and the plurality of second through holes 135 at the insulation layer on the inductance coil array are formed, a metal thin film is deposited and a photoetching process is employed to simultaneously form the plurality of driving lines 132 and the plurality of touch lines 133 electrically connected to the inductance coil array.

Figure 3F:
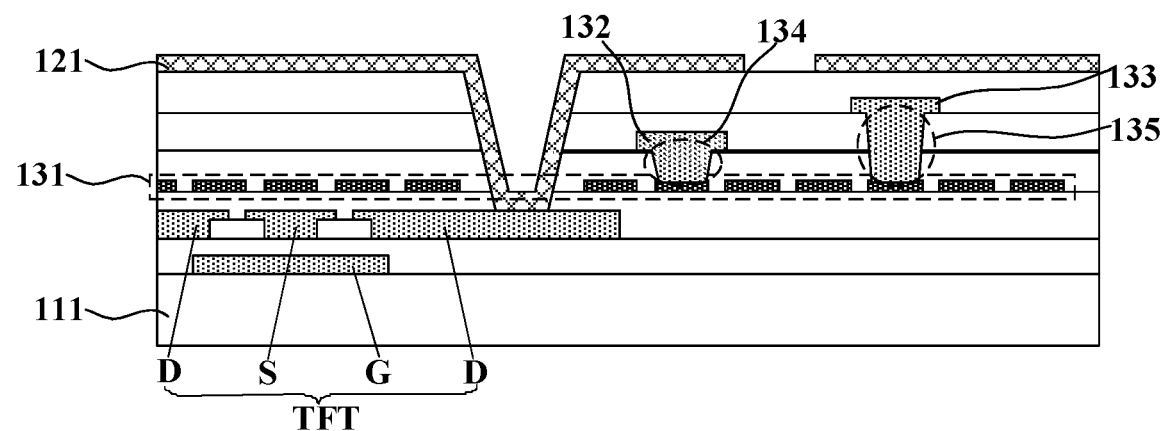

Optionally, FIG. 3F is another cross sectional view taken along A-A' in FIG. 2. FIG. 3F is different from FIG. 3A to FIG. 3E in that in the electronic paper display panel shown in FIG. 2 and FIG. 3F, optionally, the plurality of driving lines 132 are arranged between the inductance coil array and the pixel electrode array, and the plurality of touch lines 133 are arranged between the inductance coil array and the pixel electrode array. Optionally, a layer where the plurality of driving lines 132 are located and a layer where the plurality of touch lines 133 are located are different layers and insulated from each other. Optionally, after the plurality of first through holes 134 are formed at the insulation layer on the inductance coil array, a thin metal layer is deposited and a photoetching process is employed to form the plurality of driving lines 132 electrically connected to the inductance coil array; optionally, after the plurality of second through holes 135 are formed at an insulation layer on the layer where the plurality of driving lines 132 are located, a thin metal layer is deposited and a photoetching process is employed to form the plurality of touch lines 133 electrically connected to the inductance coil array.

In the multiple electric paper display panels in the above FIG. 3A to FIG. 3F, the inductance coil array is arranged between the first substrate and the pixel electrode array, the inductance coils can sense the magnetic field change contacting the electric paper display panel, and generate corresponding induced current changes according to change rate of the sensed magnetic field, such that the touch position is determined, thereby achieving in-cell inductance touch technology, in particular, achieving integration of electronic paper display technology and in-cell inductance touch technology. It should be noted that the above FIG. 3A to FIG. 3F only illustrates a part of structure of the electric paper display panel, the entire structure of the electric paper display panel that are not illustrated is not described here.

It will be understood by those skilled in the art that the arrangements of driving lines and touch lines in the electronic paper display panel include, but are not limited to, the above embodiments. The above-described arrangements of the plurality of driving lines and the touch lines can be combined with each other and recombined on the premise that the touch function of the electronic paper display panel is not affected, which are not described here.

Figure 4:
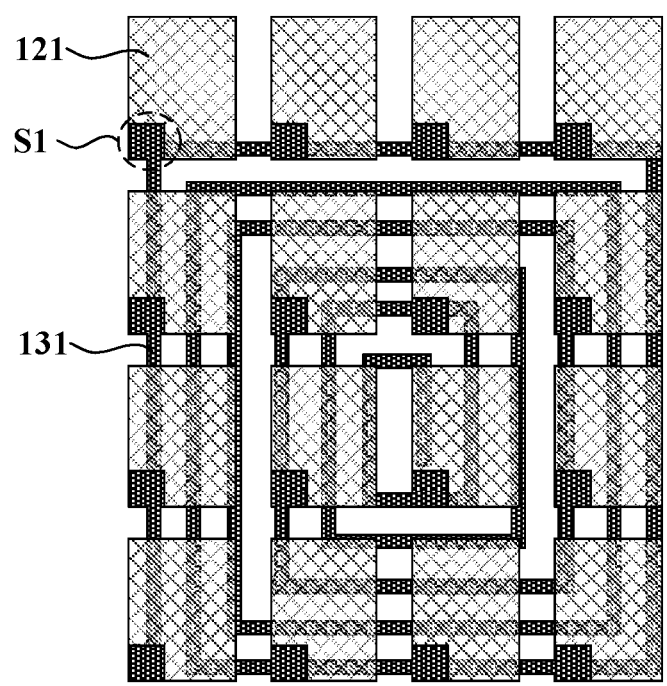
FIG. 4 to FIG. 7 are schematic views of electronic paper display panels according to embodiments of the present disclosure.

FIG. 4 shows an electronic paper display panel according to an embodiment of the present disclosure. The electronic paper display panel is different from any of the above electronic paper display panels in that, optionally, the inductance coils 131 are also functioned as light shielding coils. A winding of the inductance coil 131 has a compensation light shielding region S1 corresponding to the thin film transistor TFT. A projection of the winding of the compensation light shielding region S1 in a direction perpendicular to the electronic paper display panel covers the thin film transistors TFT. FIG. 4 only illustrates the structure of one inductance coil 131 in the electronic paper display panel. The inductance coil 131 overlaps multiple pixel electrodes 121 in the direction perpendicular to the electronic paper display panel, accordingly, the inductance coil 131 has multiple compensation light shielding regions S1, and projections of the multiple compensation light shielding regions S1 in the direction perpendicular to the electronic paper display panel cover the multiple thin film transistors TFT.

The material of the inductance coil 131 includes conductive metal, and the conductive metal is of opaque material. The projection of the winding of the compensation light shielding region S1 in the direction perpendicular to the electronic paper display panel covers thin film transistor TFT, so the winding in the compensation light shielding region S1 can block external light, thereby avoiding that external light irradiates the thin film transistor TFT, and avoiding problems such as threshold voltage shift and device characteristics failure of TFT caused by the light irradiation. Meanwhile, the inductance coils 131 can also be used as a touch structure to achieve the in-cell inductance touch technology in the electronic paper display panel. It should be noted that, in other optional embodiments, any compensation light shielding region of the inductance coil may cover multiple thin film transistors TFT at the same time, that is, the winding of the inductance coil is widened in a range corresponding to multiple thin film transistors TFT so as to cover corresponding multiple thin film transistors TFT at the same time.

Figure 5:
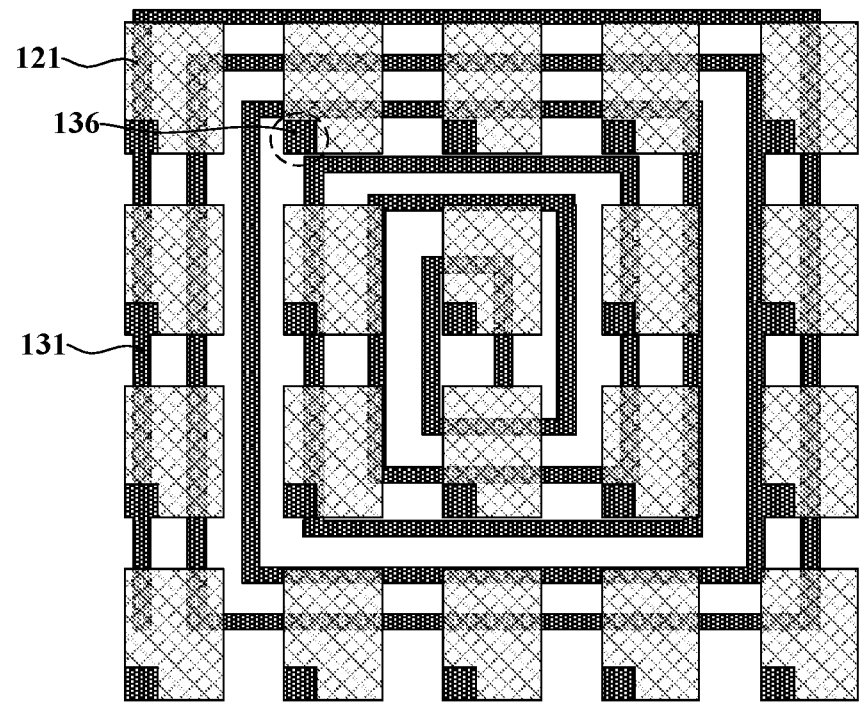

FIG. 5 shows an electronic paper display panel according to an embodiment of the present disclosure. The electronic paper display panel is different from any of the above electronic paper display panels in that, the electronic paper display panel shown in FIG. 5 further includes a plurality of compensation light shielding blocks 136 arranged at the same layer with the inductance coil array and insulated from the inductance coil array. Projections of the compensation light shielding blocks 136 in the direction perpendicular to the electronic paper display panel cover thin film transistors TFT. The compensation light shielding blocks 136 have a light blocking function for blocking external light, thereby avoiding that external light irradiates the thin film transistor TFT, and avoiding problems such as threshold voltage shift and device characteristics failure of TFT caused by the light irradiation. Optionally, the compensation light shielding blocks 136 and the inductance coils 131 are made of the same material. Optionally, the compensation light shielding blocks 136 and the inductance coils array are simultaneously formed by the screen printing process or the ink jet printing process. Optionally, the compensation light shielding blocks 136 and the inductance coils 131 are made of different materials, and the compensation light shielding blocks 136 may be made of any opaque material. Optionally, after the inductance coil array (or the compensation light shielding blocks 136) is formed by the screen printing process or the ink jet printing process, the compensation light shielding blocks 136 (or the inductance coil array) are formed by the screen printing process or the ink jet printing process. It should be noted that the compensation light shielding blocks 136 and the inductance coils 131 do not overlap at all in the direction perpendicular to the electronic paper display panel, so that short-circuiting or the like is avoided. It should be noted that, in other optional embodiments, a distance between any adjacent two turns of the winding the inductance coil may be adjusted, such that the windings of the inductance coils completely bypasses all of the thin film transistors TFT, and the compensation light shielding blocks are directly arranged at positions corresponding to the thin film transistors TFT, that is, the compensation light shielding blocks are provided in one to one correspondence with the thin film transistors TFT.

Figure 6A:
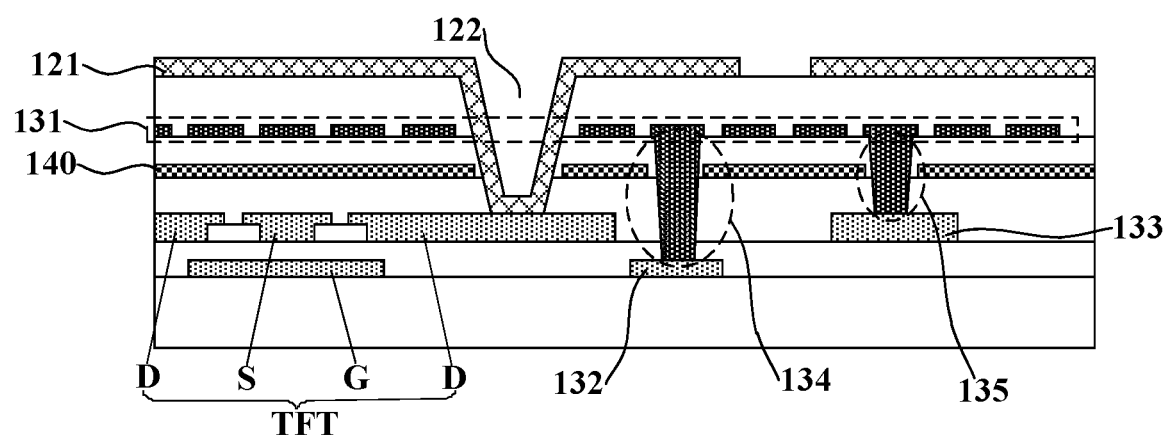

FIG. 6A shows an electronic paper display panel according to an embodiment of the present disclosure. The electronic paper display panel is different from any of the above electronic paper display panels in that, the electronic paper display panel shown in FIG. 6A further includes a compensation light shielding layer 140. A projection of the compensation light shielding layer 140 in the direction perpendicular to the electronic paper display panel covers the plurality of thin film transistors TFT. The compensation light shielding layer 140 is arranged between the thin film transistor array and the inductance coil array. The compensation light shielding layer 140 has the light shielding function for shielding external light, thereby avoiding that external light irradiates the thin film transistor TFT, and avoiding problems such as threshold voltage shift and device characteristics failure of TFT caused by the light irradiation. It should be noted that the pixel electrode 121 needs to be electrically connected to the drain electrode D of the corresponding thin film transistor TFT via a third through hole 122, therefore the compensation light shielding layer 140 is provided with a plurality of openings corresponding to the plurality of third through holes 122. If the first through holes 134 and/or the second through holes 135 penetrate through the compensation light shielding layer 140, the compensation light shielding layer 140 is provided with a plurality of openings corresponding to the plurality of the first through holes 134 and/or the plurality of the second through holes 135. In the present embodiment, the compensation light shielding layer 140 is formed between the thin film transistor array and the inductance coil array, and is merely for blocking light, therefore, optionally, the material of the compensation light shielding layer 140 may be any material capable of serving as a light shielding layer, meanwhile, the compensation light shielding layer 140 may be provided with openings to avoid short-circuiting.

Figure 6B:
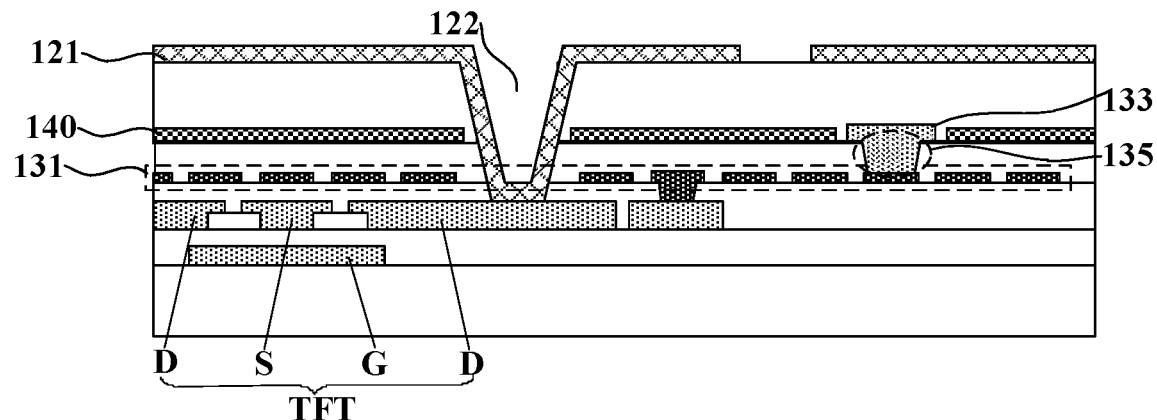

Unlike FIG. 6A, as shown in FIG. 6B, optionally, the compensation light shielding layer 140 is provided between the inductance coil array and the pixel electrode array. The compensation light shielding layer 140 is provided with a plurality of openings to avoid short-circuiting.

Figure 7:
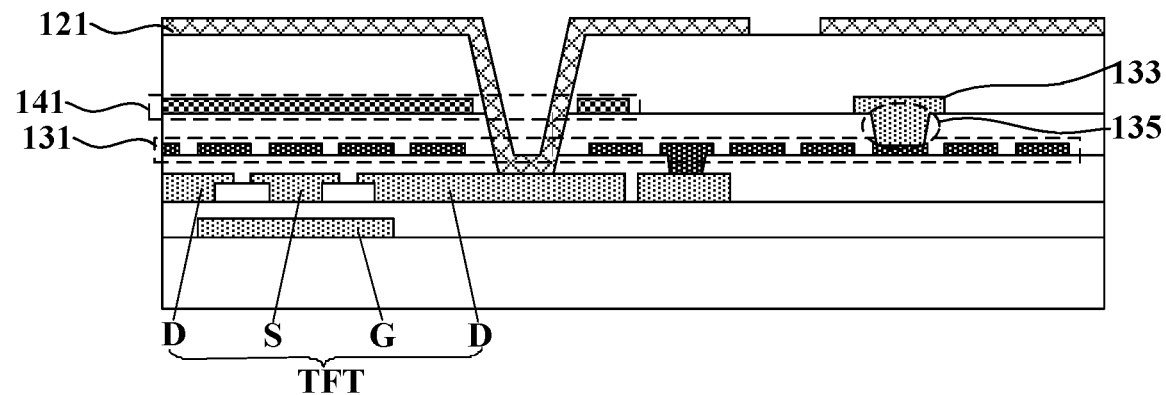

On the basis of FIG. 6A to FIG. 6B, optionally, as shown in FIG. 7, the compensation light shielding layer is divided into a plurality of compensation light shielding blocks 141. The plurality of compensation light shielding blocks 141 are correspondingly arranged with the plurality of thin film transistors TFT, respectively. A projection of the compensation light shielding block 141 in the direction perpendicular to the electronic paper display panel covers the corresponding thin film transistor TFT. The compensation light shielding blocks 141 are arranged in one to one correspondence with the thin film transistors TFT, and the projection of the compensation light shielding block 141 in the direction perpendicular to the electronic paper display panel covers the corresponding thin film transistor TFT, therefore, the compensation light shielding blocks 141 can block external light to avoid that external light irradiates the thin film transistors TFT. The compensation light shielding blocks 141 is provided with a plurality of openings, which can avoid short-circuiting. The material and the division manner of the compensation light shielding blocks are not limited, on the premise that the display function and the touch function of the electronic paper display panel are not affected.

The multiple electronic paper display panels shown in above FIGS. 4 to 7 further include a light shielding structure such as a light shielding coil, a compensation light shielding block, and/or a compensation light shielding layer and the like. The light shielding structure has the light shielding function for blocking external lights, thereby avoiding that external light irradiates the thin film transistor TFT, and avoiding problems such as threshold voltage shift and device characteristics failure of TFT caused by the light irradiation. As a result, the electronic paper display panel achieves the in-cell inductance touch technology, and can improve the display performance of the electronic paper display panel at the same time.

It should be understood by those skilled in the art that the arrangements of the light shielding structure of the electronic paper display panel include but not limited to the above embodiments. The above-described arrangements of the light shielding structure can be combined with each other and recombined on the premise that the touch function and the display function of the electronic paper display panel are not affected, which are not described here.

Figure 8:
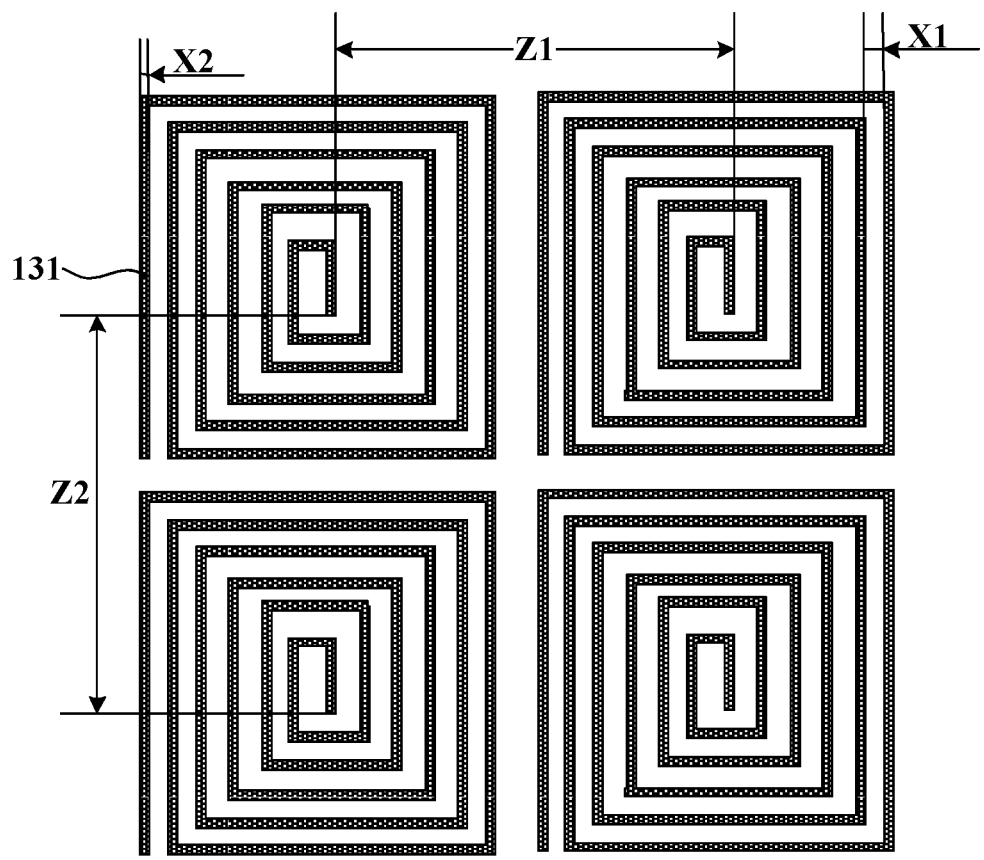
FIG. 8 is a schematic top view of an inductance coil array of the electronic paper display panel according to an embodiment of the present disclosure.

FIG. 8 is a schematic top view of the inductance coil array of the electronic paper display panel according to an embodiment of the present disclosure. Optionally, the plurality of inductance coils 131 are arranged in array. A distance Z1 between center points of any two inductance coils 131 which are adjacent in a row direction of the array is greater than or equal to 1 mm, and less than or equal to 7 mm, and a distance Z2 between center points of any two inductance coils 131 which are adjacent in a column direction of the array is greater than or equal to 1 mm, and less than or equal to 7 mm. Here, illustrated are merely 2*2 inductance coils 131 of the electronic paper display panel. The electronic paper display panel provided by embodiments of the present disclosure can be used with a stylus. The precision of the existing conventional stylus is about 1.5, that is, the size of the nib of the stylus is about 1.5 mm, so the size of the inductance coil may be arranged according to the size of the nib of the stylus so as to match the accuracy of the inductance coil with the stylus, thereby increasing the accuracy of the touch detection. If the size of the inductance coil 131 is too large, the accuracy of the touch detection is low. It will be understood by those skilled in the art that the spacing of the inductance coils can be arranged according to the changes of the electronic paper display panel and the precision of the supplementary stylus, other embodiments will not be provided in the present disclosure. On the other hand, preferably, the distance Z2 between the center points of any adjacent two inductance coils in an electronic paper display panel is consistent, and the distance Z1 between the center points of any adjacent two inductance coils in an electronic paper display panel is consistent, such that the blind touch point is avoided and the touch accuracy is increased.

Optionally, a line spacing X1 between any adjacent two turns of windings of the inductance coil 131 is greater than or equal to 4 μm, a line width X2 of the winding of the inductance coil 131 is greater than or equal to 2 μm. When the line spacing X1 of the inductance coil 131 is 4 μm and the line width X2 is 2 μm, an inductance coil 131 within a size of 1 mm can realize a number of turns of about 80. Since the magnetic flux is proportional to the number of coil turns, the greater the number of turns of the inductance coil 131 per unit area, the greater the amount of the signal generated by the inductance coil 131, and the higher the accuracy of the touch detection, thereby achieving high-precision touch and high-precision touch detection of the stylus and real reproduction of the script.

Figure 9A:
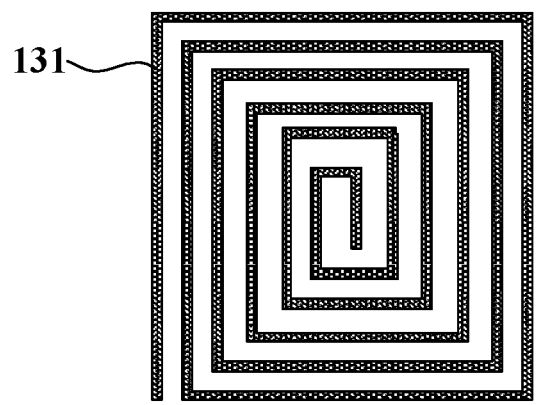
FIG. 9A to FIG. 9C are schematic top views showing three kinds of inductance coils of the electronic paper display panel according to embodiments of the present disclosure.
Figure 9B:
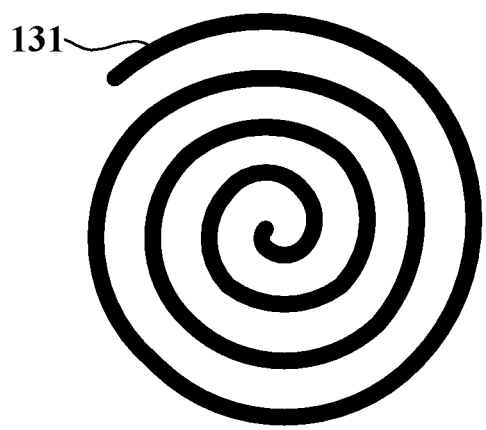
Figure 9C:
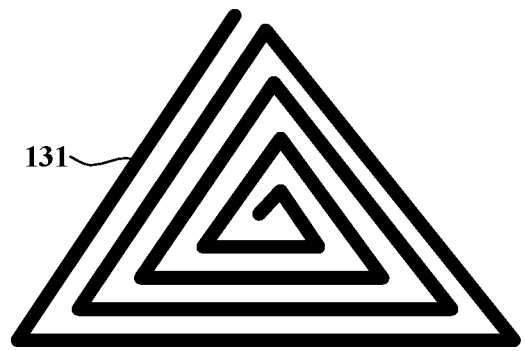

FIG. 9A to FIG. 9C are schematic views showing three kinds of inductance coils of the electronic paper display panel according to embodiments of the present disclosure. Optionally, as shown in FIG. 9A, the winding of the inductance coil 131 is wound in square to form the plurality of turns of the inductance coil 131. Optionally, as shown in FIG. 9B, the winding of the inductance coil 131 is wound in circle to form the plurality of turns of the inductance coil 131. Optionally, as shown in FIG. 9C, the winding of the inductance coil 131 is wound in rectangle to form the plurality of turns of the inductance coil 131. The shape of the inductance coil 131 provided by embodiments of the present disclosure includes but is not limited to square, circular and triangular shapes, and those skilled in the art can set the winding shape of the inductance coil according to the manufacturing process and the product demand, as long as the inductance coil is continuous and non-closed. No mandatory requirement is made for the shape of the winding of the inductance coil. In addition to the shape change, in the winding manner of the inductance coil, the wiring of the inductance coil can also be widened by turns, not limited to maintain a consistent line width or spacing.

Figure 10:
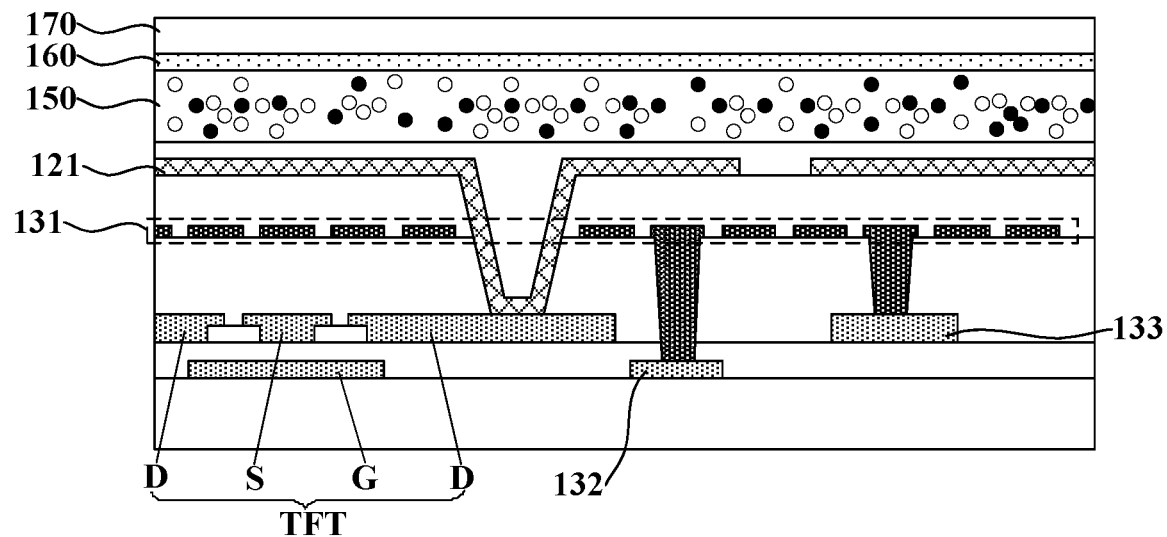
FIG. 10 is a schematic cross sectional view of an electronic paper display panel according to an embodiment of the present disclosure.

FIG. 10 is a schematic cross sectional view of an electronic paper display panel according to an embodiment of the present disclosure. The electronic paper display panel further includes an electrophoretic function layer 150, a common electrode layer 160 and a protection film 170, which are sequentially arranged on the pixel electrode array, and a peripheral driving circuit (including the driving IC 102 shown in FIG. 2) arranged on the first substrate 110. The peripheral driving circuit has a driving signal terminal and a plurality of touch signal terminals. The driving signal terminal of the peripheral driving circuit is electrically connected to the plurality of driving lines 132, respectively. The plurality of touch signal terminals are correspondingly arranged with the plurality of touch lines 133 respectively, the touch signal terminal of the peripheral driving circuit is electrically connected to the corresponding touch line 133.

Optionally, the common electrode layer 160 of the electronic paper display panel in an embodiment of the present disclosure is a planar electrode. Optionally, the protection film 170 is a PV polymer, however, is not limited to the PV polymer. The electrophoretic function layer 150, the common electrode layer 160 and the protection film 170 of an embodiment of the present disclosure typically serve as a display function layer and are directly bonded to the first substrate by adhesives. A storage capacitor (not shown) is further provided in an embodiment of the present disclosure to improve ability of maintaining voltage of the pixel electrode. TP lines and an active layer are arranged at the same layer. A light shielding metal layer is provided under the pixel, and the inductance coils are formed by etching.

In a display stage, the peripheral driving circuit drives the thin film transistor array to control charging of the pixel electrode. Based on the special characteristics of electronic paper display, electrophoretic reflection colors are adopted to implement display. In a touch stage, the peripheral driving circuit applies touch driving signals to the inductance coils 131 via the driving lines 132, and collects touch sensing signals of the inductance coils 131 via the touch lines 133 to determine the touch position.

An embodiment of the present disclosure further provides a touch detecting method for an electronic paper display panel. The electronic paper display panel includes a first substrate and a pixel electrode array which is arranged on the first substrate; an inductance coil array disposed between the first substrate and the pixel electrode array which includes a plurality of inductance coils arranged in array, each inductance coil has an input terminal and an output terminal; a plurality of driving lines correspondingly arranged with the plurality of inductance coils respectively, each driving line is electrically connected to the input terminal of the corresponding inductance coil; and a plurality of touch lines correspondingly arranged with the plurality of inductance coils respectively, each touch line is electrically connected to the output terminal of the corresponding inductance coil.

Figure 11:
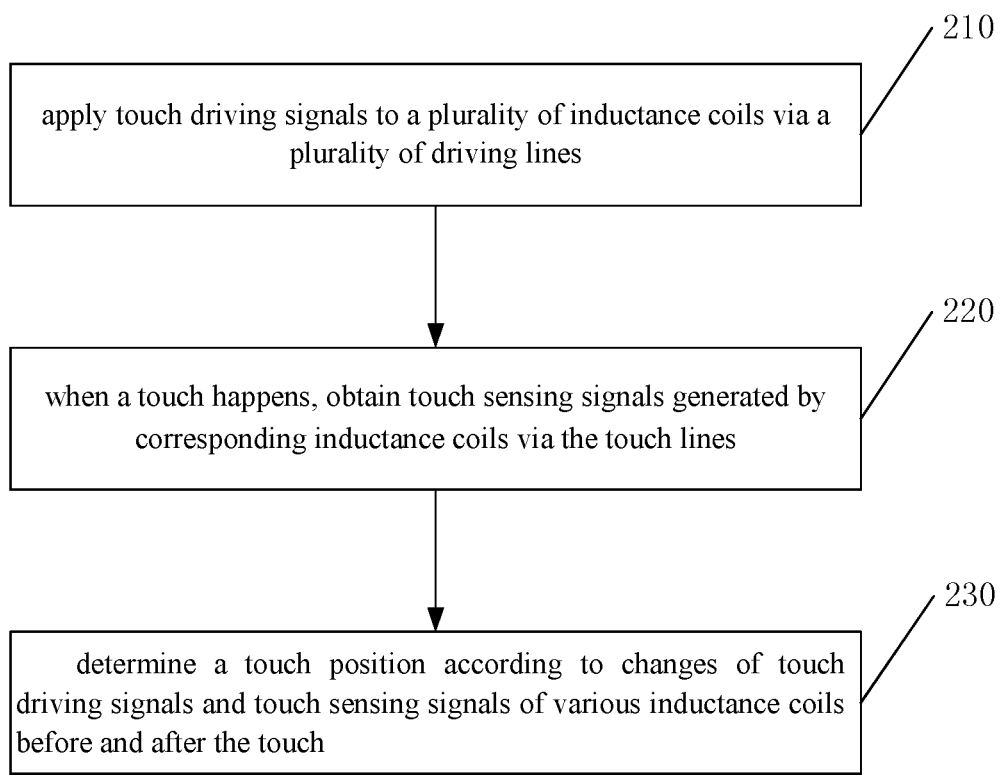
FIG. 11 is a flowchart of a touch detecting method of an electronic paper display panel according to an embodiment of the present disclosure.

As shown in FIG. 11, the touch detection method includes the following.

In step 210, touch driving signals are applied to a plurality of inductance coils via a plurality of driving lines;

In step 220, when a touch happens, touch sensing signals generated by corresponding inductance coils are obtained via the touch lines;

In step 230, a touch position is determined according to changes of touch driving signals and touch sensing signals of various inductance coils before and after the touch.

The electronic paper display panel in an embodiment of the present disclosure is used with a stylus. The stylus can transmit high frequency alternating magnetic flux to generate a magnetic field. The magnetic field can penetrate the electrophoretic function layer, the protection film and the common electrode and the like of the electronic paper display panel, and will not be shielded by the common electrode layer. The current in the inductance coil can change according to variation rate of the sensed magnetic field.

In the touch detection, the driving IC applies driving current signals of the same frequency and magnitude to various inductance coils of the inductance coil array via the plurality of driving lines. During inputting by touching with the stylus, various inductance coils can sense change of the magnetic field of the stylus and currents of various inductance coils can change according to change rate of the sensed magnetic field. The driving IC collects sensing current signals of various inductance coils via the plurality of touch lines. The driving IC determines a touch position according to current changes of various inductance coils.

In view of the above, the electronic paper display panel provided by embodiments of the present disclosure can achieve integration of electronic paper display technology and in-cell inductance touch technology, as well as passive stylus-based touch, high precision touch, real reduction of handwriting and the like.

An embodiment of the present disclosure further provides an electronic device. The electronic device includes any of above described electronic paper display panels. The electronic device may be an electronic paper reader, and may be any electronic device capable of employing the electronic paper display technology.

It is noted that the above is only preferred embodiments of the present disclosure and the technical principles employed. It will be understood by those skilled in the art that the present disclosure is not limited to the specific embodiments described herein and that various modifications, adaptations, combinations and substitutions can be made by those skilled in the art without departing from the scope of the present disclosure. Thus, while the present disclosure has been described in detail by way of the above embodiments, the present disclosure is not limited to the above embodiments, but may include more and more equivalent embodiments without departing from the inventive concept, and the scope of present disclosure is determined by the appended claims.

What is claimed is:

1. An electronic paper display panel, comprising:
a first substrate;
a pixel electrode array arranged on the first substrate;
an inductance coil array, disposed between the first substrate and the pixel electrode array, wherein the inductance coil array includes a plurality of inductance coils arranged in an array, each of the plurality of inductance coils has an input terminal and an output terminal;

a plurality of driving lines each corresponding to a respective one of the plurality of inductance coils and electrically connected to the input terminal of the respective one of the plurality of inductance coils; and a plurality of touch lines each corresponding to a respective one of the plurality of inductance coils and electrically connected to the output terminal of the respective one of the plurality of inductance coils;

wherein the first substrate comprises a substrate and a thin film transistor array disposed on the substrate, wherein the thin film transistor array comprises a plurality of thin film transistors each having a drain electrode and a gate electrode;

wherein the pixel electrode array comprises a plurality of pixel electrodes, each corresponding to a respective one of the plurality of thin film transistors, and electrically connected to the drain electrode of the respective one of the plurality of thin film transistors; and wherein the plurality of touch lines is arranged at a same layer as the gate electrodes of the plurality of thin film transistors and is insulated from the gate electrodes of the plurality of thin film transistors.

2. The electronic paper display panel of claim 1, wherein the plurality of driving lines is arranged between the thin film transistor array and the inductance coil array.

3. An electronic paper display panel, comprising:
a first substrate;
a pixel electrode array arranged on the first substrate;
an inductance coil array, disposed between the first substrate and the pixel electrode array, wherein the inductance coil array includes a plurality of inductance coils arranged in an array, each of the plurality of inductance coils has an input terminal and an output terminal;
a plurality of driving lines each corresponding to a respective one of the plurality of inductance coils and electrically connected to the input terminal of the respective one of the plurality of inductance coils;
a plurality of touch lines each corresponding to a respective one of the plurality of inductance coils and electrically connected to the output terminal of the respective one of the plurality of inductance coils; and
a plurality of compensation light shielding blocks arranged at a same layer as the inductance coil array and insulated from the inductance coil array, wherein projections of the plurality of compensation light shielding blocks in a direction perpendicular to the electronic paper display panel shadow the plurality of thin film transistors,
wherein the first substrate comprises a substrate and a thin film transistor array disposed on the substrate, wherein the thin film transistor array comprises a plurality of thin film transistors each having a drain electrode and a gate electrode;
wherein the pixel electrode array comprises a plurality of pixel electrodes, each corresponding to a respective one of the plurality of thin film transistors, and electrically connected to the drain electrode of the respective one of the plurality of thin film transistors.

4. The electronic paper display panel of claim 3, wherein the plurality of compensation light shielding blocks and the plurality of inductance coils are made of a same material.

5. An electronic paper display panel, comprising:
a first substrate;
a pixel electrode array arranged on the first substrate;
an inductance coil array disposed between the first substrate and the pixel electrode array, wherein the inductance coil array includes a plurality of inductance coils arranged in an array, each of the plurality of inductance coils has an input terminal and an output terminal;
a plurality of driving lines each corresponding to a respective one of the plurality of inductance coils and electrically connected to the input terminal of the respective one of the plurality of inductance coils; and
a plurality of touch lines each corresponding to a respective one of the plurality of inductance coils and electrically connected to the output terminal of the respective one of the plurality of inductance coils;
wherein the first substrate comprises a substrate and a thin film transistor array disposed on the substrate, wherein the thin film transistor array comprises a plurality of thin film transistors each having a drain electrode and a gate electrode;
wherein the pixel electrode array comprises a plurality of pixel electrodes, each corresponding to a respective one of the plurality of thin film transistors, and electrically connected to the drain electrode of the respective one of the plurality of thin film transistors; and
wherein the plurality of driving lines is arranged at the same layer with the drain electrodes of the plurality of thin film transistors and is insulated from the drain electrodes of the plurality of thin film transistors.

6. The electronic paper display panel of claim 5, wherein the plurality of touch lines is arranged between the thin film transistor array and the inductance coil array.

7. The electronic paper display panel of claim 5, wherein the plurality of touch lines is arranged between the inductance coil array and the pixel electrode array.

8. The electronic paper display panel of claim 5, further comprising a compensation light shielding layer, wherein a projection of the compensation light shielding layer in a direction perpendicular to the electronic paper display panel shadows the plurality of thin film transistors; and
wherein the compensation light shielding layer is arranged between the thin film transistor array and the inductance coil array.

9. An electronic paper display panel, comprising:
a first substrate;
a pixel electrode array arranged on the first substrate;
an inductance coil array, disposed between the first substrate and the pixel electrode array, wherein the inductance coil array includes a plurality of inductance coils arranged in an array, each of the plurality of inductance coils has an input terminal and an output terminal;
a plurality of driving lines each corresponding to a respective one of the plurality of inductance coils and electrically connected to the input terminal of the respective one of the plurality of inductance coils; and
a plurality of touch lines each corresponding to a respective one of the plurality of inductance coils and electrically connected to the output terminal of the respective one of the plurality of inductance coils;
wherein the first substrate comprises a substrate and a thin film transistor array disposed on the substrate, wherein the thin film transistor array comprises a plurality of thin film transistors each having a drain electrode and a gate electrode;
wherein the pixel electrode array comprises a plurality of pixel electrodes, each corresponding to a respective one of the plurality of thin film transistors, and electrically connected to the drain electrode of the respective one of the plurality of thin film transistors; and
wherein the plurality of driving lines is arranged at a same layer as the gate electrodes of the plurality of thin film transistors and is insulated from the gate electrodes of the plurality of thin film transistors.

10. The electronic paper display panel of claim 9, further comprising a compensation light shielding layer, wherein a projection of the compensation light shielding layer in a direction perpendicular to the electronic paper display panel shadows the plurality of thin film transistors; and
wherein the compensation light shielding layer is arranged between the inductance coil array and the pixel electrode array.

11. The electronic paper display panel of claim 9, further comprising an electrophoretic function layer, a common electrode layer and a protection film, sequentially arranged on the pixel electrode array, and a peripheral driving circuit arranged on the first substrate;
wherein the peripheral driving circuit has a driving signal terminal and a plurality of touch signal terminals, wherein the driving signal terminal of the peripheral driving circuit is electrically connected to the plurality of driving lines, respectively, wherein the plurality of touch signal terminals each is electrically connected to one of the plurality of touch lines.

12. An electronic paper display panel, comprising:
a first substrate;
a pixel electrode array arranged on the first substrate;
an inductance coil array disposed between the first substrate and the pixel electrode array, wherein the inductance coil array includes a plurality of inductance coils arranged in an array, each of the plurality of inductance coils has an input terminal and an output terminal;
a plurality of driving lines each corresponding to a respective one of the plurality of inductance coils and electrically connected to the input terminal of the respective one of the plurality of inductance coils; and
a plurality of touch lines each corresponding to a respective one of the plurality of inductance coils and electrically connected to the output terminal of the respective one of the plurality of inductance coils;
wherein the first substrate comprises a substrate and a thin film transistor array disposed on the substrate, wherein the thin film transistor array comprises a plurality of thin film transistors each having a drain electrode and a gate electrode;
wherein the pixel electrode array comprises a plurality of pixel electrodes, each corresponding to a respective one of the plurality of thin film transistors, and electrically connected to the drain electrode of the respective one of the plurality of thin film transistors; and
wherein the plurality of touch lines is arranged at a same layer as the drain electrodes of the plurality of thin film transistors and is insulated from the drain electrodes of the plurality of thin film transistors.

13. The electronic paper display panel of claim 12, wherein the plurality of driving lines is arranged at a same layer as the gate electrodes of the plurality of thin film transistors.

14. The electronic paper display panel of claim 12, wherein the plurality of inductance coils is further configured to shield light as light shielding coils, wherein windings of the plurality of inductance coils have compensation light shielding regions corresponding to the plurality of thin film transistors, wherein projections of the windings in the compensation light shielding region in a direction perpendicular to the electronic paper display panel shadows the plurality of thin film transistors.

15. The electronic paper display panel of claim 12, wherein a distance between center points of two adjacent inductance coils in a row direction of the inductance coil array ranges from 1 mm to 7 mm, and a distance between center points of two adjacent inductance coils in a column direction of the inductance coil array ranges from 1 mm to 7 mm.

16. The electronic paper display panel of claim 12, further comprising an electrophoretic function layer, a common electrode layer and a protection film, sequentially arranged on the pixel electrode array, and a peripheral driving circuit arranged on the first substrate;
wherein the peripheral driving circuit has a driving signal terminal and a plurality of touch signal terminals, wherein the driving signal terminal of the peripheral driving circuit is electrically connected to the plurality of driving lines, respectively, wherein the plurality of touch signal terminals each is electrically connected to one of the plurality of touch lines.

17. The electronic paper display panel of claim 12, wherein the plurality of inductance coils is wound in squares or circles to form multi-turn inductance coils.

18. The electronic paper display panel of claim 12, further comprising a compensation light shielding layer, wherein a projection of the compensation light shielding layer in a direction perpendicular to the electronic paper display panel shadows the plurality of thin film transistors; and
wherein the compensation light shielding layer is arranged between the thin film transistor array and the inductance coil array, or, the compensation light shielding layer is arranged between the inductance coil array and the pixel electrode array.

19. The electronic paper display panel of claim 18, wherein the compensation light shielding layer is divided into a plurality of compensation light shielding blocks, each corresponding to a respective one of the plurality of thin film transistors, wherein a projection of the plurality of compensation light shielding blocks each in a direction perpendicular to the electronic paper display panel shadows said thin film transistor.

20. The electronic paper display panel of claim 18, wherein a space between two adjacent turns of one of the plurality of inductance coils is greater than or equal to 4 μm, and a wire diameter of the plurality of inductance coils is greater than or equal to 2 μm.

* * * * *